United States Patent [19]

Hewitt

[11] 4,041,212

[45] Aug. 9, 1977

[54] ALKALINE ELECTRIC STORAGE BATTERIES

[75] Inventor: Albert Thomas Hewitt, Redditch, England

[73] Assignee: Chloride Group Limited, London, England

[21] Appl. No.: 687,599

[22] Filed: May 18, 1976

[30] Foreign Application Priority Data

May 21, 1975 United Kingdom ............... 21937/75

[51] Int. Cl.² ............................................. H01M 2/26
[52] U.S. Cl. ..................................... 429/89; 429/160; 429/161; 429/184; 429/186
[58] Field of Search ............... 429/178, 181, 182, 184, 429/186, 208, 161, 211, 89, 160

[56] References Cited

U.S. PATENT DOCUMENTS

| 1,342,511 | 6/1920 | Shank | 429/184 |
| 1,781,640 | 11/1930 | Holland | 429/161 |
| 1,782,984 | 11/1930 | Carlile | 429/184 |
| 3,919,371 | 11/1975 | Jache | 429/184 |
| 3,981,744 | 9/1976 | Greatbatch et al. | 429/181 |

*Primary Examiner*—Donald L. Walton
*Attorney, Agent, or Firm*—Watson, Cole, Grindle & Watson

[57] ABSTRACT

The plates of each polarity of an alkaline battery are connected by a sheet metal connector which passes through a slot in the bottom of a well formed in the battery lid, and which is supported by means of a pair of ears projecting from the connector which rest on the lid. Each connector is secured against vertical movement by abutment of the ears against the upper surface of the lid and by abutment of a respective plate strap to which each connector is welded against the lower surface of the lid. Horizontal movement in one plane is prevented by the provision of a shoulder on the lid on each side of each ear, and in the other plane by abutment of the connector, or the ears, against the edge of the well or a further shoulder respectively. The slots are sealed by means of a sealant which fills the wells. Upstanding ribs are provided on the upper surface of the lid so as to increase the length of the leakage path between neighboring cells.

12 Claims, 8 Drawing Figures

ALKALINE ELECTRIC STORAGE BATTERIES

This invention relates to electric storage batteries of alkaline electrolyte type, and is concerned with their terminal or intercell connectors.

It has hitherto been common practice in the design of alkaline cells to provide each cell with separate steel terminal pillars of circular cross section each connected at its lower end to the electrodes and at its upper end screw threaded to receive nuts for connecting it either to a terminal of a neighboring cell or to an external connection.

At the point where the terminal pillar passes through the lid it is necessary to provide a liquid-tight gland or seal to prevent loss of electrolyte by spillage or creapage, resulting from the action of electrocapillarity. The gland or seal is often in the form of an elastic washer held compressed by a nut and washer fitted over the free end of the terminal pillar.

It is not easy to ensure satisfactory sealing and in addition the manufacture of circular section terminal pillars involves comparatively expensive operations and the provision of additional components such as nuts, washers and sealing members.

According to the present invention an electric storage battery of alkaline electrolyte type has at least one cell whereof the electrode plates of each polarity are provided with a connector formed of sheet metal extending up through a narrow elongated slot in the lid and having a pair of ears projecting from its edges and resting on supporting surfaces of the lid adjacent the ends of the slot to support the weight of the electrode plates.

It should perhaps be pointed out that it is customary in batteries of alkaline electrolyte type to support the electrode plates by the connectors, which often means supporting them by the sealing means of the connector, unlike the electrode plates of lead acid accumulators of which the lower edges rest on ribs, referred to as "mudribs" upstanding from the bottom of the casing.

In one form of the invention the connector is secured beneath the lid to a plate strap having a surface abutting upwards against a downwardly facing surface of the lid to prevent upward movement of the electrode plates. Conveniently this is effected by spot welding opposed vertical surfaces of the connector and plate strap. In this way the differences of level due to manufacturing tolerances can be compensated for, since the two surfaces can be secured together irrespective of their precise relative levels.

Preferably each slot is encircled by an upstanding wall serving to confine a sealing material which seals the slot. Thus the lid may be formed with a well for each conductor, the slot being formed in the bottom of the well, which, after insertion of the connector, is covered with a sealing material. In practice the well may be filled with such a sealing material.

In such an arrangement the supporting surfaces on which the ears of the connector rest may be formed by the floor of the lid at the margin of the well. In addition each ear may be interposed between a pair of shoulders upstanding from the supporting surface to prevent horizontal movement perpendicular to the plane of the connector. In addition the edge of each ear may abut against a shoulder upstanding from the supporting surface to prevent horizontal movement in the plane of the connector. Alternatively each connector may be provided with a portion located and dimensioned to fix into the top of the well to prevent horizontal movement in the plane of the connector.

Accordingly in a preferred arrangement the connector is located against up and down vertical movement, and in addition it is located against horizontal movement either in its plane or perpendicular to its plane at the level of the top of the well, whilst in addition it is a snug fit in the slot in the bottom of the well so as to be similarly located at that level.

In one form of the invention the lid has an upstanding rib extending round each connector and separating it from connectors at other potentials.

Thus in the case of a single cell the lid may afford a rib extending round the periphery and a further rib extending across the middle of it so as to separate the two terminals. In the case of a multi-cell battery the lid has a peripheral rib together with ribs separating each intercell connector from other intercell connectors or terminals and each terminal from other terminals.

Thus one of the problems that has arisen in electric storage batteries of alkaline electrolyte type is the tendency of alkaline electrolyte to creep along the metal conductors from within the cell to the external surface of the lid. This tendency is increased by the effect of electrocapillarity and the amount of electrolyte creepage may be such that an electrolyte path is established between two or more cells, in the case of a multi-cell arrangement. An electrolyte path between neighboring cells results in leakage of current on open circuit and inefficient charging of some cells. Furthermore, a film of electrolyte on exposed metal parts of the conductors may cause discoloration or even corrosion. With the preferred arrangement in accordance with the present invention, the wells in the lid and through which the conductors pass, provide for a depth of sealant, thereby increasing the length of the leakage path and inhibiting the creepage of electrolyte along it. An additional obstacle is provided by the upstanding ribs in the lid, between each connector and any connectors at a different potential.

Cells which normally evolve gases when being charged are provided with vents for the emission of such gases which carry with them droplets of electrolyte. These may discolor or corrode exposed metal parts of the connectors and may accumulate and penetrate around or under any sealant and establish an electrolyte path between neighboring cells. In its preferred form the present invention provides for a cover plate of plastics material to enclose the upstanding ribs and connector(s). The plate is provided with openings for the terminals and vent plugs and is sealed to the peripheral ribs of the lid by any conventional means. The accumulation of droplets of electrolyte on and around the sealant covering the conductors is thus avoided.

The present invention is particularly applicable to multi-cell electric storage batteries. In this case each end terminal will have a connector as referred to above and if desired the intermediate cell terminals may also be as referred to, the intercell connections being effected externally in a conventional manner. In a preferred arrangement, however, each pair of adjacent cells has an intercell connection comprising two connectors formed integrally in the shape of a Greek letter $\pi$, two ears, one of each connector, being merged to form a connecting bridge.

In such a case preferably upstanding ribs rise to the level of the top of each intercell connection and the space enclosed by the ribs is filled with a sealing material so as to encapsulate the intercell connectors. Such a battery may have a cover covering the upstanding ribs and intercell connectors and formed with openings through which the terminals project or are accessible.

The invention may be put into practice in many ways, but two embodiments of a battery constructed in accordance with the invention will now be described by way of example with reference to the accompanying drawings in which.

Figure 1:
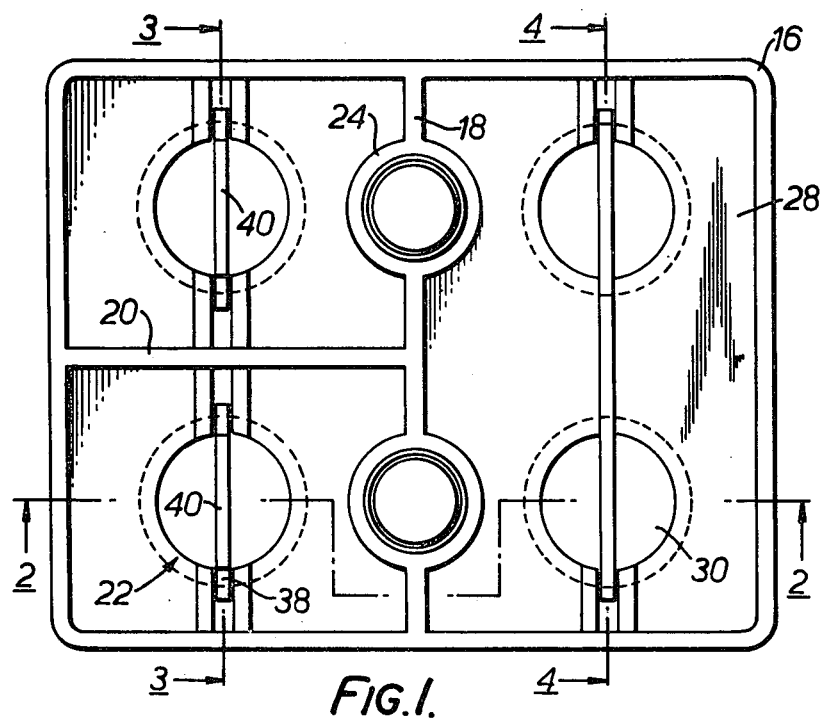
FIG. 1 is a plan view below the top cover of a turn cell battery of nickel cadmium type.

In the battery shown in FIGS. 1 to 4 each cell is mounted in a separate casing 3 of a plastics material but the two casings are joined together, as by a cement or adhesive tape, and provided with a single monobloc lid 2. The lid is in the form of a tray having an upstanding peripheral rib 16 extending completely around its edge. A similar transverse rib 18 extends across the middle of the lid parallel to the ends of the cells so as to divide the lid into two halves each lying over half of each cell. In addition one of these halves is divided into two quarters by a longitudinal rib 20 perpendicular to the ends of the cells to accommodate the terminals 22.

Figure 2:
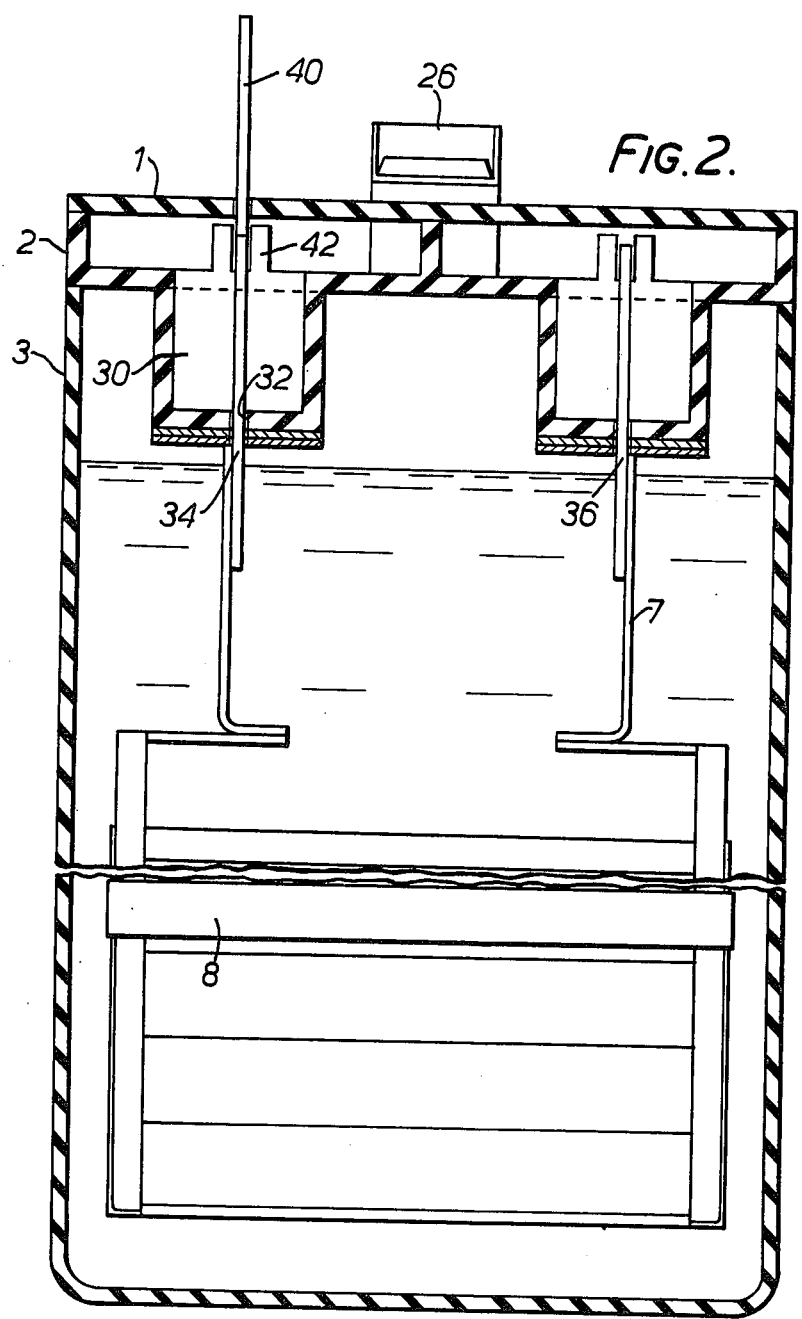
FIG. 2 is a sectional elevation on the line 2—2 in FIG. 1.

The transverse rib 18 incorporates a screw threaded tubular boss 24 over each cell to receive a threaded vent plug 26, shown in FIG. 2.

In each quarter the floor 28 of the lid is formed with a depending circular well 30 having a slot 32 formed in the bottom to receive a conductor 34 or 36 connected to the electrodes 5 or 6 of one polarity of one cell. The electrodes are separated from one another by conventional separator material 9.

In each of the walls accommodating terminals the conductor is in the form of a flat plate the lower part of which is relatively narrow to pass through the slot in the bottom of the well whilst the upper part is sufficiently wide to fit in the well and in addition has a pair of projecting ears 38 to rest on the floor of the lid. The terminal connector 40 is inserted into the well and its lower end is then threaded through a rubber washer 13 and a metal washer 12 and a plate strap 7 bent to L form is pressed against the metal washer face to face with the end of the conductor 34 and secured as by spot welding to the latter. The lower end of the plate strap is secured as by welding to the appropriate electrodes of the cell.

Figure 4:
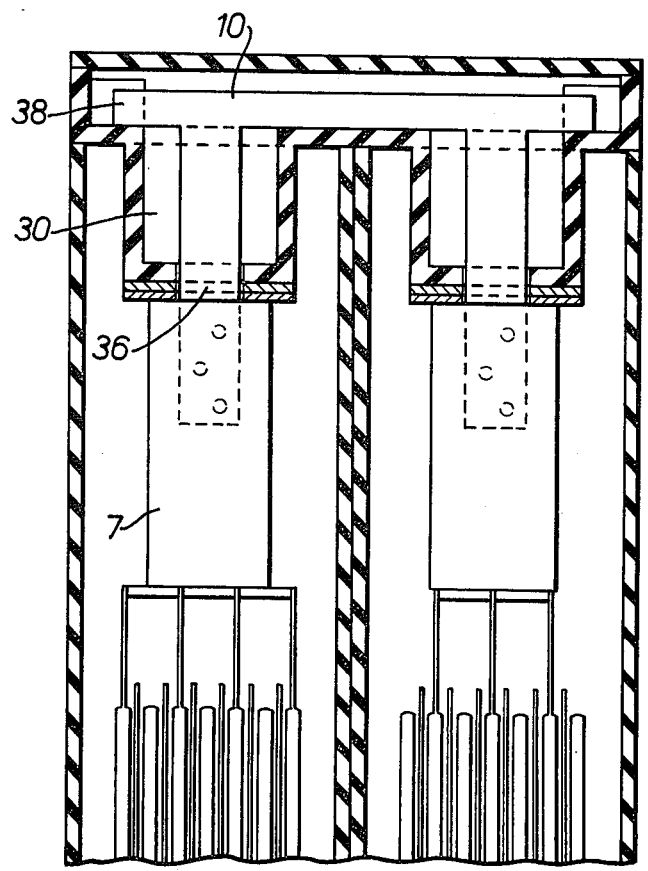
FIG. 4 is a sectional elevation on the line 4—4 in FIG. 1.
Figure 3:
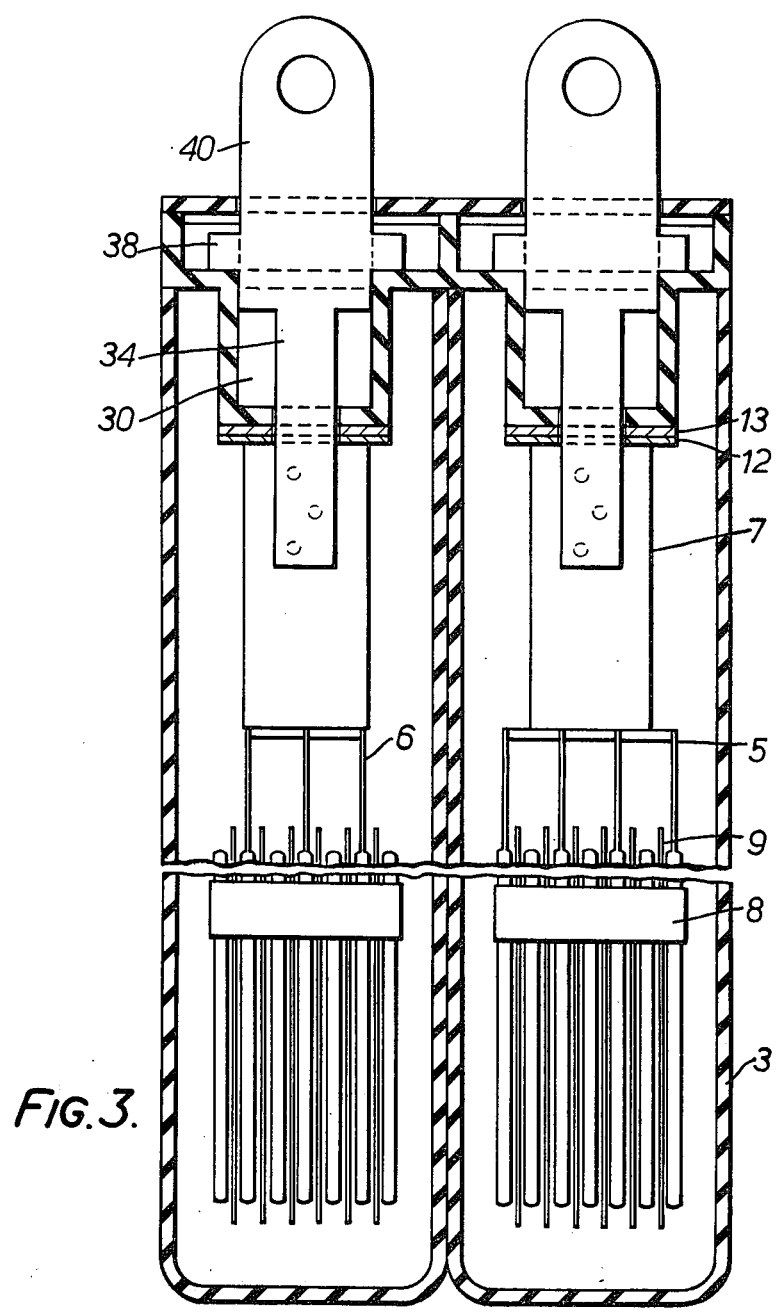
FIG. 3 is a sectional elevation on the line 3—3 of FIG. 1.

The remaining half of the lid accommodates the intercell connector. As shown in FIG. 4 this comprises a plate formed of sheet steel in the form of the Greek letter π comprising a pair of vertical legs 36 joined at the top by a bridge 10 which projects beyond them. The legs 36 are of a width to pass through the slots 2 in the bottoms of the wells and are inserted so as to do so with the intermediate portion of the bridge and the ears 38 formed by its projecting ends resting on the floor of the lid. Washers 12 and 13 are then threaded over them and plate straps 7 are secured to them as in the case of the terminals.

The floor of the lid adjacent the walls is provided with pairs of ribs 42 upstanding from it and spaced by a distance slightly exceeding the thickness of the ears 38 so as to locate the latter between them, thus preventing rotation or lateral displacement of the connector strip.

The groups of electrodes 5 and 6 which are separated from one another by strips 9 of conventional separator material and are secured together by a strap 8 are then inserted into the casings 3 and the lid 2 is sealed thereto by cementing or heat sealing. A thermoplastic, thermosetting or self curing sealant, preferably an epoxy resin containing a foaming agent as described in British Pat. No. 1,220,987 is then introduced into the wells and preferably also the space in the lid bounded by the ribs 42. Finally a flat cover 1 which overlies the intercell connector, but has slots through which the terminal lugs 40 project up, and holes through which the vent plugs 26 can extend, is located and sealed over the lid and screwed vent plugs 26 are inserted through the holes in the cover plate to engage with the screw threaded bosses 24 in the lid.

The abutment of the plate straps 7 against the steel washers 12 prevents upward movement of the terminal strips and intercell connector and at the same time compresses the resilient washers 13 slightly so as to seal the slots in the bottoms of the wells to prevent leakage of the sealant.

Each terminal connector is thus located against lateral movement and rotation, both at the bottom of the well by the slot 32 and at the top of the well where lateral movement in one plane and rotation is prevented by engagement of the ears 38 with the ribs 42, and lateral movement in the other plane is prevented by engagement of the under portion of the connector with the sides of the well.

Figure 5:
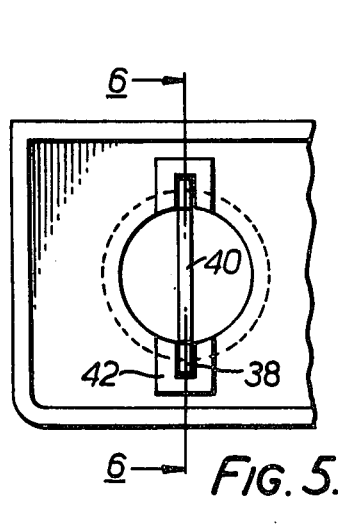
FIG. 5 is a plan view of a modified form of terminal connector.
Figure 6:
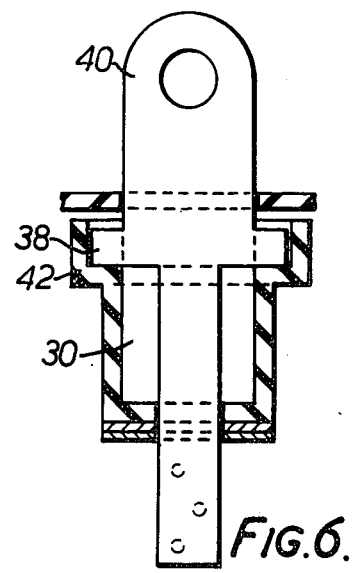
FIG. 6 is a section on the line 6—6 of FIG. 5.

FIGS. 5 and 6 show a modified terminal connector in which the upper portion of the connector in the well is narrower than the well. In this case lateral stability, in the plane of the connector, is provided by the ribs 42 which are united into a U-shape, as seen in plan, so as to abut the edges of the ears 38 so as to prevent horizontal movement of the connector in its own plane.

Figure 7:
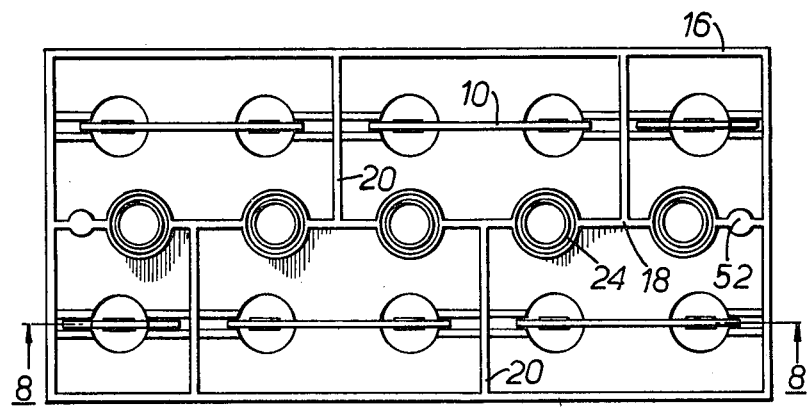
FIG. 7 is a plan view below the top cover of a five celled battery of nickel cadmium type.
Figure 8:
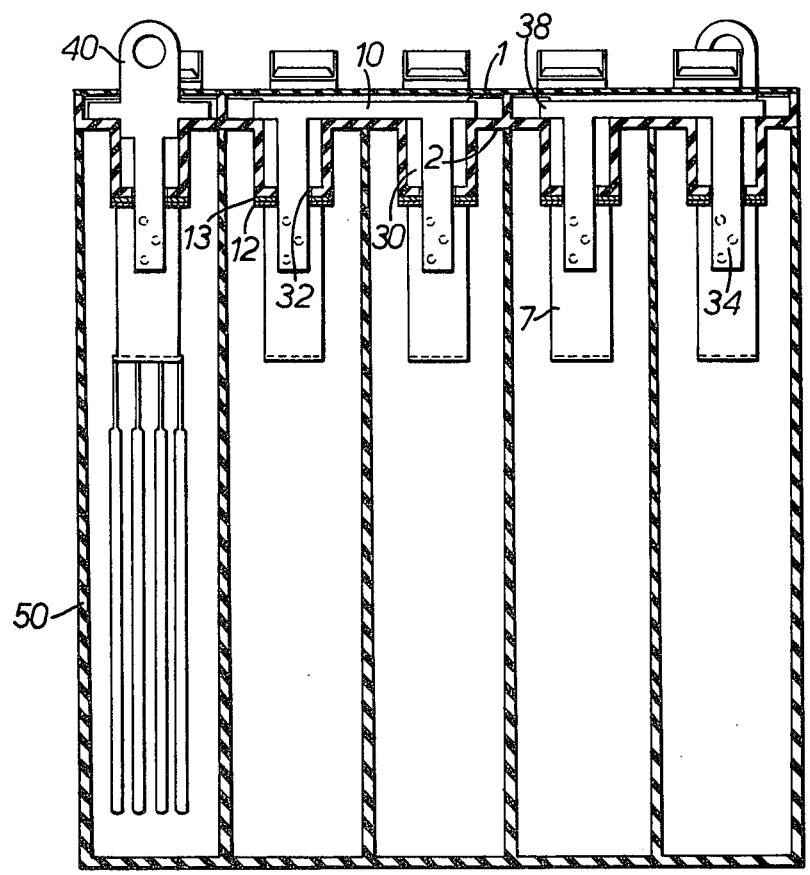
FIG. 8 is a sectional elevation on the line 8—8 in FIG. 7.

FIGS. 7 and 8 show a further embodiment of the invention which is similar to the first, except that the battery comprises five cells and is accommodated in a monobloc casing 50. A full description of this embodiment is not necessary and similar parts have been given the same reference numerals as in FIGS. 1 to 6.

Each cell is of elongated plan form with one or two of its long sides shared with a neighboring cell or cells. The lid 2 is provided with a peripheral rib 16 and a longitudinal dividing rib 20 bisecting the long sides of the cells, and with transverse ribs 18 joining the longitudinal rib over alternate halves of alternate intercell partitions. Thus at opposite corners of the lid there are two spaces for terminals, each corresponding to half a cell, the remaining space being divided into four intercell compartments each extending over half of one cell and half of a neighboring cell. Bosses 24 to receive the vent plugs 26 are formed in the longitudinal partition which may also have in it one or more smaller bosses 52 to be drilled through to receive an electrolyte level probe (not shown).

In other respects the second embodiment is similar to the first and it is thought unnecessary to describe it is further detail.

It will be appreciated that many modifications may be made to these embodiments without departing from the scope of the invention. Although the bosses for receiving the vent plugs have been described as screw threaded the method of securing may be by bayonet fastening permanent bond, or some other means. The invention has been specifically described with reference to a monobloc lid associated wih either single or nonoblock containers, however the invention is equally applicable to any combination of monobloc or single lids with monobloc or single containers.

What we claim as our invention and desire to secure by Letters Patent is:

1. An electric storage battery of alkaline electrolyte type, comprising:
   a case accommodating at least one cell, said cell including plates of each polarity;
   a lid covering said case and including at least one elongated slot and a respective supporting surface at each end of said slot;
   at least one pair of plate straps, each plate strap respectively interconnecting said plates of each polarity; and
   at least one pair of metal strip connectors, each connector extending above said lid for respective external connection to the plates of each polarity and extending downwardly through said elongated slot, the lower end of each said connector being secured to the associated plate strap and including an ear projecting respectively from its opposite edges and resting on said supporting surfaces to support the weight of said electrode plates within said case.

2. A battery as claimed in claim 1 in which each said connector is secured beneath the lid to a respective plate strap, and each said plate strap includes a surface abutting upwards against a downwardly facing surface of said lid to prevent upward movement of the electrode plates.

3. A battery as claimed in claim 2 in which opposed vertical surfaces of a respective connector and plate strap are spot welded.

4. A battery as claimed in claim 1 in which said lid includes at least one well for each said connector and encircling said at least one slot, and further comprising a sealing material in said well for sealing said at least one slot.

5. A battery as claimed in claim 4 in which said supporting surfaces are formed by the floor of the lid at a peripheral area of said well.

6. A battery as claimed in claim 1 in which each said supporting surface includes a pair of shoulder member upstanding therefrom and the respective ear being interposed therebetween to prevent horizontal movement perpendicular to the plane of each said connector.

7. A battery as claimed in claim 6 in which each said shoulder is U-shaped and the edge of each ear abuts against a respective shoulder to prevent horizontal movement in the plane of the connector.

8. A battery as claimed in claim 5 in which each said connector includes a portion located and dimensioned to fit into the top of a respective wall to prevent horizontal movement in the plane of said connector.

9. A battery as claimed in claim 1 in which said lid incudes an upstanding rib extending around each said connector and separating it from connectors at other potentials.

10. A battery as claimed in claim 1 further comprising a plurality of additional cells, each said additional cell including plates of each polarity and a plurality of intercell connections, each intercell connection being formed integrally in the shape of the Greek letter $\pi$, said lid further including a plurality of additional slots and respective supporting surfaces at each end of each said slot, each additional slot being positioned over a respective one of said plurality of cells, the respective leg of each said intercell connection extending through a respective slot in adjacent cells and being secured to a respective plate strap therein, the connecting bridge of each said intercell connection including an ear projecting from each end thereof and resting on a respective one of said supporting surfaces to support the weight of said electrode plates within said case.

11. A battery as claimed in claim 10 wherein said lid further includes upstanding ribs rising from the floor thereof to the level of the top of each said intercell connector, and further comprising sealing material in the space between said ribs to encapsulate said plurality of intercell connections.

12. A battery as claimed in claim 10 further comprising openings in said lid and vent plugs sealing the same and a cover plate including openings for the portion of each said connector extending above said lid, and said cover plate being sealed to said lid.

* * * * *